UNITED STATES PATENT OFFICE.

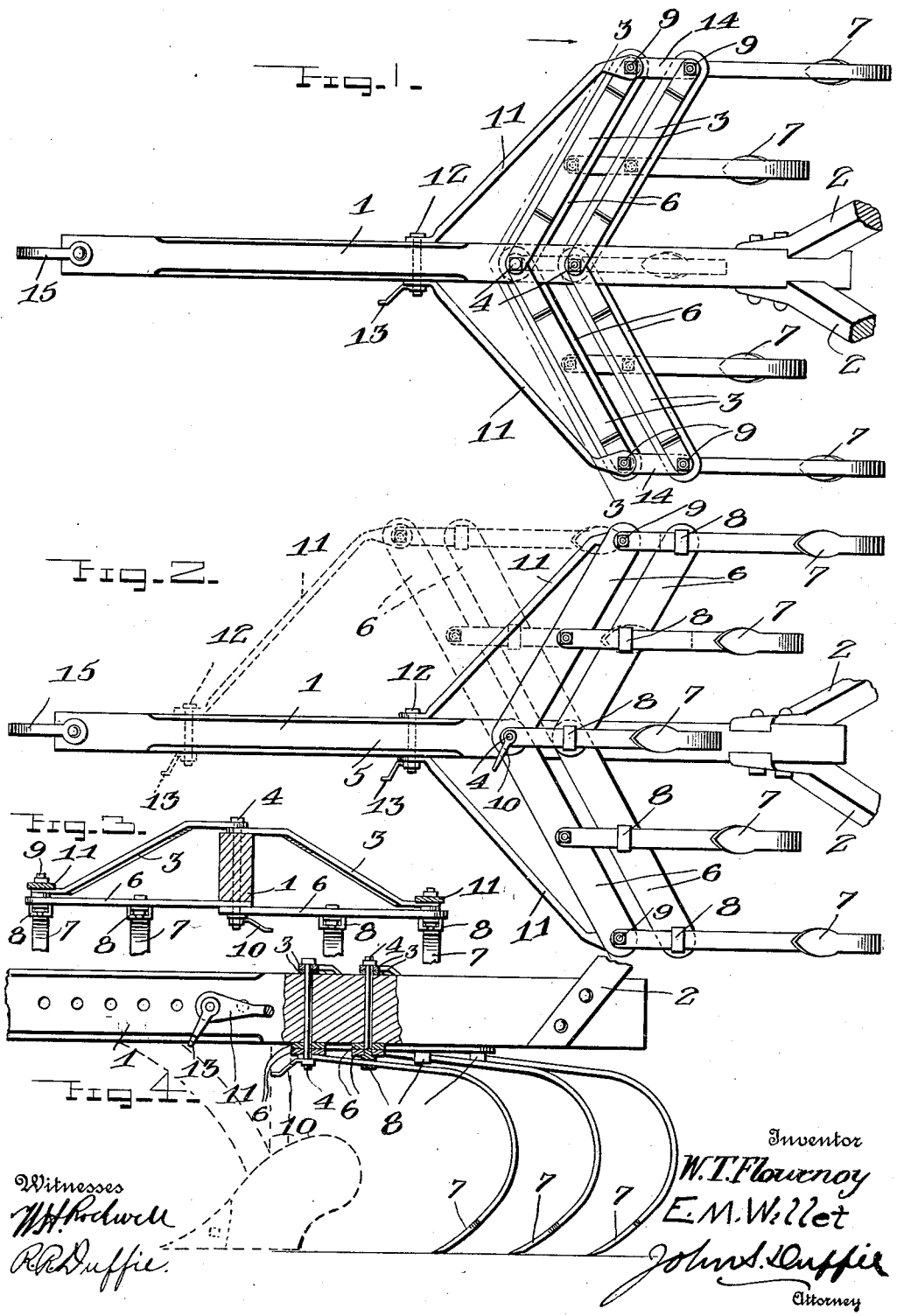

WILLIAM T. FLOURNOY AND EDGAR M. WILLET, OF EL DORADO, ARKANSAS.

HARROW ATTACHMENT FOR PLOWS.

1,005,527.  Specification of Letters Patent.  Patented Oct. 10, 1911.

Application filed September 14, 1910. Serial No. 581,951.

*To all whom it may concern:*

Be it known that we, WILLIAM T. FLOURNOY and EDGAR M. WILLET, citizens of the United States, residing at El Dorado, in the State of Arkansas, have invented certain new and useful Improvements in Harrow Attachments for Plows, of which the following is a specification.

Our invention has relation to new and useful improvements in harrow attachments for one-horse plows and the main object of the invention is to produce an attachment that is adjustable, durable and efficient.

A further object of our invention is to provide clamping means for each harrow tooth which materially strengthens the same.

By removing the center tooth of our harrow, which is easily done, a plow may be attached to the beam of the harrow as illustrated in Figure 4 of the drawings. This harrow may also be attached to the rear end of any ordinary plow and when so employed the center tooth of said harrow will be used. The harrow teeth may be adjusted at whatever position is desired in relation to the beam by a simple change in the position of the rods or arms to which said teeth are secured, the construction and operation of said arms being more fully described hereinafter.

One of the several positions that the teeth may assume other than that illustrated in Fig. 1, is shown by the dotted lines in Fig. 2.

With the foregoing and other objects in view our invention consists of the novel combination, construction and arrangement of the parts as are described in this specification, illustrated in the accompanying drawings forming a part thereof and particularly pointed out in the appended claims.

Reference being had to the drawings: Fig. 1 is a top plan view of our harrow in normal position, parts of the handles being broken away. Fig. 2 is a bottom plan view of our harrow, parts of the handles being broken away, the dotted lines indicating one of the several positions that the harrow teeth may assume. Fig. 3 is a vertical, transverse section of the harrow on the line 3—3 of Fig. 1, parts of the harrow teeth being broken away, the central tooth being removed, looking rearward. Fig. 4 is a partial side elevation of our invention, partly in section, part of the handles being broken away, the position of the plow when secured to the beam being indicated by the dotted lines.

Referring more particularly to the drawings, in which like numerals designate like parts throughout and which are not drawn to any particular scale, our invention is described as follows:

The beam 1 is provided at the rear end thereof with the usual handles 2 for the guidance of the harrow. Extending from each side of the top face of the beam 1 are a pair of arms 3, pivotally held to said beam by means of nut and bolt connections 4 passing therethrough and through the beam. Extending from the under face 5 of said beam to each side thereof is a corresponding pair of arms 6 also pivotally held to said beam by said nut and bolt connections 4, passing therethrough and through the beam. A plurality of harrow teeth 7 are pivotally held at their forward ends to the under face of their corresponding forward arms 6, each of said teeth passing through a loop 8 secured to the under face of the rear corresponding arms 6, said loops being pivotally held in relation to their respective arms. Said arms 3 are each secured at their outer ends to the outer ends of their respective arms 6 by means of nut and bolt connections 9 passing therethrough. Said arms 3 therefore cause said arms 6 to be substantially braced and strengthened thus preventing the harrow teeth 7 from losing their horizontal alinement.

The center tooth 7 is adapted to be removed from its position as shown in Fig. 2 by disengaging the nut 10 from its bolt 4, disengaging the forward end of the central tooth from said bolt 4 when the nut 10 may be replaced upon said bolt. The central harrow tooth is then slipped from its respective loop 8 thereby permitting a plow to be attached to the beam 1, as illustrated in Fig. 4, as above stated.

Pivotally held at the outer end of each forward arm 3 is a brace 11, said braces adapted to be secured to the beam 1 by nut and bolt connections 12, which nut and bolt connections may be passed through either one of a plurality of horizontal perforations 13 passing through said beam 1. If desired, a plurality of nut and bolt connections 12 may be employed and one of said braces may be secured at one point along the beam 1 while the other is secured at a different point, as indicated by the dotted lines in Fig. 2. Each of said nuts of the nut and bolt connections 4 and 12 is provided with arms 13 formed integral therewith for the manipulation of the same.

Each pair of arms 3 and their corresponding pair of arms 6 are held in parallel relation to each other by means of a metallic strip 14 interposed therebetween at their ends, said metallic strips being held in pivotal relation to said arms 3 and 6 by means of the nut and bolt connections 9 passing therethrough and through said arms. The usual clevis 15 is provided at the forward end of the beam 1.

Although we have described the combination, construction and arrangement of the several parts of our invention, yet we do not confine ourselves to such specific combination, construction and arrangement but reserve and may exercise the right to make such changes therein as do not depart from the spirit of the invention or the scope of the claims hereunto appended.

Having described our invention what we claim as new and desire to secure by Letters Patent, is:

1. In a harrow of the class described the combination with a beam of a pair of arms extending from the upper face of said beam to each side thereof, a pair of arms extending from the under face of said beam to each side thereof, each pair of said arms which extends from the under face of the beam corresponding respectively to the pair of arms which extends from the upper face of the beam in the same direction, said upper arms being secured at their outer ends to their respective lower arms at their outer ends, a plurality of harrow teeth pivotally secured to the forward arms of the lower pair of arms and passing through loops pivotally secured to the under face of the rear arms of said lower pair of arms, all of said arms being pivotally held to the beam and adapted to have their positions changed in relation to said beam thereby changing the positions of the harrow teeth in relation to said beam, all of said arms which extend from the beam of said plow to the right being adjustably held thereto totally independent of the arms which extend to the left of the beam, means consisting of braces whereby the arms and harrow teeth are secured in the desired position, each of said braces adapted to be secured to any point along the beam desired independent of each other, substantially as shown and described.

2. In a harrow of the class described the combination with a beam of a pair of arms extending from the upper face of said beam to each side thereof, a pair of arms extending from the under face of said beam to each side thereof, each pair of said arms which extend from the under face of the beam corresponding respectively to the pair of arms which extends from the upper face of the beam in the same direction, said upper arms being secured at their outer ends to their respective lower arms at their outer ends, means to connect the outer ends of each pair of arms comprising a metallic strip, said strips being for the purpose of securing the arms of each pair in parallel relation to each other, a plurality of harrow teeth pivotally secured to the forward arms of the lower pair of arms and passing through loops pivotally secured to the under face of the rear arms of said lower pair of arms, all of said arms being pivotally held to the beam and adapted to have their positions changed in relation to said beam thereby changing the positions of the harrow teeth in relation to said beam, means consisting of braces whereby the arms and harrow teeth are secured in the desired position, each of said braces adapted to be secured to any point along the beam desired independent of each other, the central tooth being removably secured to the lower arms and adapted to be removed when it is desired to secure a plow directly to the beam of said harrow.

In testimony whereof we affix our signatures, in presence of two witnesses.

WILLIAM T. FLOURNOY.
EDGAR M. WILLET.

Witnesses:
NEILL C. MARSH,
ALFMIER F. CUNIKEN.